United States Patent [19]

Brettle et al.

[11] Patent Number: 4,812,171

[45] Date of Patent: Mar. 14, 1989

[54] IRREVERSIBLE PHOTOCHROMIC MARKINGS

[75] Inventors: Jack Brettle, Greens Norton; Clive Trundle, Silverstone, both of England

[73] Assignee: The Plessey Company, Essex, England

[21] Appl. No.: 162,384

[22] PCT Filed: Jun. 25, 1987

[86] PCT No.: PCT/GB87/00447

§ 371 Date: Apr. 7, 1988

§ 102(e) Date: Apr. 7, 1988

[87] PCT Pub. No.: WO88/00223

PCT Pub. Date: Jan. 14, 1988

[30] Foreign Application Priority Data

Jun. 27, 1986 [GB] United Kingdom ................ 8615706

[51] Int. Cl.$^4$ ............................................. C09D 11/00
[52] U.S. Cl. ........................................ 106/21; 427/7; 428/29; 428/411.1; 430/10; 430/11; 524/87
[58] Field of Search ................ 106/21; 524/87; 427/7; 428/29, 411; 430/10, 11

[56] References Cited

U.S. PATENT DOCUMENTS 4,252,879  2/1981  Inoue et al. .............................. 430/9

Primary Examiner—Amelia Burgess Yarbrough
Attorney, Agent, or Firm—Sughrue, Mion, Zinn, Macpeak & Seas

[57] ABSTRACT

A photochromic ink composition which comprises a solution of a 1,2-dihydroquinoline (DHQ) in a polymer solution, the dihydroquinoline being sensitive or sensitized to ultra-violet light.

8 Claims, No Drawings

IRREVERSIBLE PHOTOCHROMIC MARKINGS

This invention relates to photochromic ink compositions which are converted irreversibly to their coloured state by exposure to light having a U.V. component.

1,2-Dihydroquinolines (DHQ) will colour irreversibly when exposed to U.V. light in the presence of an acid. If the N-hydrogen in the 1,2-dihydroquinoline is substituted by an electron withdrawing group, e.g. acetyl, the compounds will colour in neutral conditions.

The present invention makes use of this behaviour of 1,2-dihydroquinolines for practical purposes.

According to one aspect of the present invention there is provided a photochromic ink composition which comprises a solution of a 1,2-dihydroquinoline in a polymer solution, the dihydroquinoline being sensitive or sensitised to ultra-violet light.

The DHQ can be sensitised by including an acid in the ink composition. An example of a suitable acid is trichloroacetic acid. Other acids of similar pKa value are suitable.

Alternatively, a DHQ may be selected in which the nitrogen atom has an electron-withdrawing substituent and in this case, the compounds are U.V. sensitive in both neutral and acid conditions.

Specific examples of DHQ's which may be employed in the present invention are represented by the general formula (I):

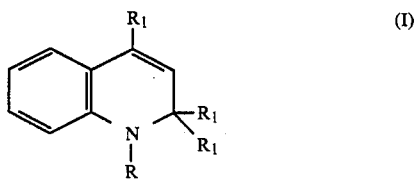

in which

R is hydrogen or an alkyl group or an electron withdrawing group, and

R1 are independently selected from alkyl groups.

The alkyl groups represented by R and R1 are preferably lower alkyl groups (i.e. containing up to 5 carbon atoms), e.g. methyl, ethyl or propyl groups.

DHQ's having other substituents (including substituents in the benzene ring) may however be used, although the absorption spectra of the compounds may be shifted by introducing particular substituents.

The ink compositions may be prepared by forming a polymer solution using a solvent, such as toluene or xylene, in which the DHQ is soluble. Suitable polymers should desirably not absorb U.V. light strongly and should form a colourless, flexible coating on the substrate on evaporation of the solvent. Sufficient DHQ is dissolved in the polymer solution to cause a colour change on irradiation with U.V. light.

Generally, a DHQ concentration of from about 0.2 to 2% in the polymer solution is satisfactory. When necessary, an acid is dispersed in the polymer solution prior to addition of the DHQ. The amount of acid necessary depends on its strength, but in the case of trichloroacetic acid, about 1 to 2% is sufficient.

A dried coating of a DHQ containing ink or inks of the present invention will colour strongly, usually to yellow-green on irradiation with light containing a U.V. component. The colour change is permanent.

An important practical application of the photochromic inks is in marking of substrates, e.g. for security or validation purposes. Thus, for example the ink may be screen-printed onto a substrate and dried to form an invisible latent image. On irradiating with U.V. light, the printed marking will immediately become visible and thus may be used for checking whether goods or documents are authentic. The marking may be printed onto any substrate including a label.

Another application of the inks of the present invention is providing a lithographic method of producing images on substrates without the need for a wet development step. Thus a layer of the ink may be coated onto a substrate, e.g. by screen printing, and dried. an image can then be photographically produced on the coated substrate by exposing the layer to U.V. light through a negative or stencil.

Substrates coated with a layer of the photochromic inks can also be used as a photo-sensitive layer for writing using a laser of the appropriate wavelength.

Although the inks of this invention are intended primarily for use with U.V. light sources which emit in the 300 to 380 nm waveband, they are also sensitive to broad band light sources which contain an appreciable U.V. component, e.g. an unfiltered photographic flash gun or strong sunlight. Thus, references in this application to irradiating the compositions with U.V. light are intended to include exposure to light sources which include a U.V. component.

The following Examples will illustrate the invention.

EXAMPLE 1

1,2-Dihydro-2,2,4-trimethylquinoline (50mg) was dissolved in a solution of polymethylmethacrylate (pmma) (1g) and toluene (3 grm) and trichloroacetic acid (40mg) added. The resulting solution was poured onto a glass plate and allowed to dry yielding a colourless polymer film. The film was irradiated with ultra violet light (366 nm) which caused a colour change to apple green with maximum absorption occurring at 670 nm.

EXAMPLE 2

1,2-Dihydro-2,2,4-trimethyl-N-acetylquinoline (10mg) was dissolved in a solution of pmma (1 grm) and toluene (3 grm). The resulting solution was poured onto a glass plate and allowed to dry yielding a colourless polymer film. The film was irradiated with ultra violet light which caused a colour change to yellow with maximum absorption occurring at 410 nm.

We claim:

1. A photochromic ink composition which comprises a solution of a 1,2-dihydroquinoline (DHQ) in a polymer solution, the dihydroquinoline being sensitive or sensitised to ultra-violet light.

2. A composition according to claim 1 which is sensitised towards U.V. light by inclusion of an acid.

3. A composition according to claim 1 in which the nitrogen atom in the DHQ has an electron-withdrawing substituent, thereby rendering the composition U.V. sensitive.

4. A composition according to claim 3 in which the electron-withdrawing group is an N-acetyl group.

5. A composition according to any one of the preceding claims in which the DHQ is present in an amount of from about 0.2 to 2% by weight of the polymer solution.

6. A method of applying a security or validation mark to a substrate which comprises printing a mark in an ink composition as claimed in any one of claims 1 to 4 onto the substrate and drying the ink, thereby producing a latent marking which is made visible by irradiating the substrate with U.V. light.

7. A method of producing an image on a substrate which comprises forming a dried coating of a composition as claimed in any one of claims 1 to 4 on a substrate and exposing the dried coating to U.V. light through a stencil or negative to form an image.

8. A substrate having a latent validation or security marking printed thereon, said marking having been formed by the method claimed in claim 6.

* * * * *